United States Patent
Ossikovski et al.

(10) Patent No.: US 7,151,631 B2
(45) Date of Patent: Dec. 19, 2006

(54) METHOD FOR MODELING OPTICAL FIBER AMPLIFIERS

(75) Inventors: Razvigor Ossikovski, Villebon-sur-Yvette (FR); Patrick Even, Lannion (FR); Nicolas Tallaron, Lannion (FR)

(73) Assignee: Highwave Optical Technologies (FR)

( * ) Notice: Subject to any disclaimer, the term of this patent is extended or adjusted under 35 U.S.C. 154(b) by 25 days.

(21) Appl. No.: 10/497,881

(22) PCT Filed: Dec. 6, 2002

(86) PCT No.: PCT/FR02/04210
§ 371 (c)(1),
(2), (4) Date: Jun. 4, 2004

(87) PCT Pub. No.: WO03/049240
PCT Pub. Date: Jun. 12, 2003

(65) Prior Publication Data
US 2005/0068610 A1    Mar. 31, 2005

(30) Foreign Application Priority Data
Dec. 7, 2001    (FR) ................................ 01 15842

(51) Int. Cl.
*H01S 3/00* (2006.01)

(52) U.S. Cl. .................................... 359/337
(58) Field of Classification Search ............... 359/337, 359/341.1
See application file for complete search history.

(56) References Cited

U.S. PATENT DOCUMENTS 6,381,560 B1 *    4/2002    Shah et al. .................... 703/2

OTHER PUBLICATIONS

Ossikovski et al., "Analytic Model for the Erbium—Ytterbium Co-Doped Silicate Fiber Amplifier", Optical Devices For Fiber Communication III, vol. 4638, pp. 41-51, 2002.
Valley, "Modeling Cladding-Pumped Er/Yb Fiber Amplifiers", Optical Fiber Technology, vol. 7, No. 1, pp. 21-44, Jan. 2001.
Sorbello et al., "Numerical modeling and experimental investigation of double-cladding erbium-ytterbium-doped fibre", Optical and Quantum Electronics, vol. 33, No. 6, pp. 599-619, Jun. 2001.
Peterka et al., "Characterization and modelling of Er/Yb codoped fibres", Photonics, Devices, And Systems, vol. 4016, pp. 282-287, Jun. 1999.

* cited by examiner

*Primary Examiner*—Mark Hellner
(74) *Attorney, Agent, or Firm*—Lerner, David, Littenberg, Krumholz & Mentlik, LLP

(57) ABSTRACT

The present invention provides a method of modeling an optical fiber amplifier, the method being characterized in that it comprises the steps consisting in:
  establishing (100) the speed equations and the propagation equations of physical phenomena or effects involved in an optical fiber amplifier;
  obtaining (112) exact analytic solutions for the propagation equations of signals in the fiber, discretizing them, and interpolating them along the fiber;
  solving (120) the previously discretized speed equations by injecting into them solutions obtained from the propagation equations; and
  delivering (130) the performance parameters of the fiber in terms of amplification.

16 Claims, 4 Drawing Sheets

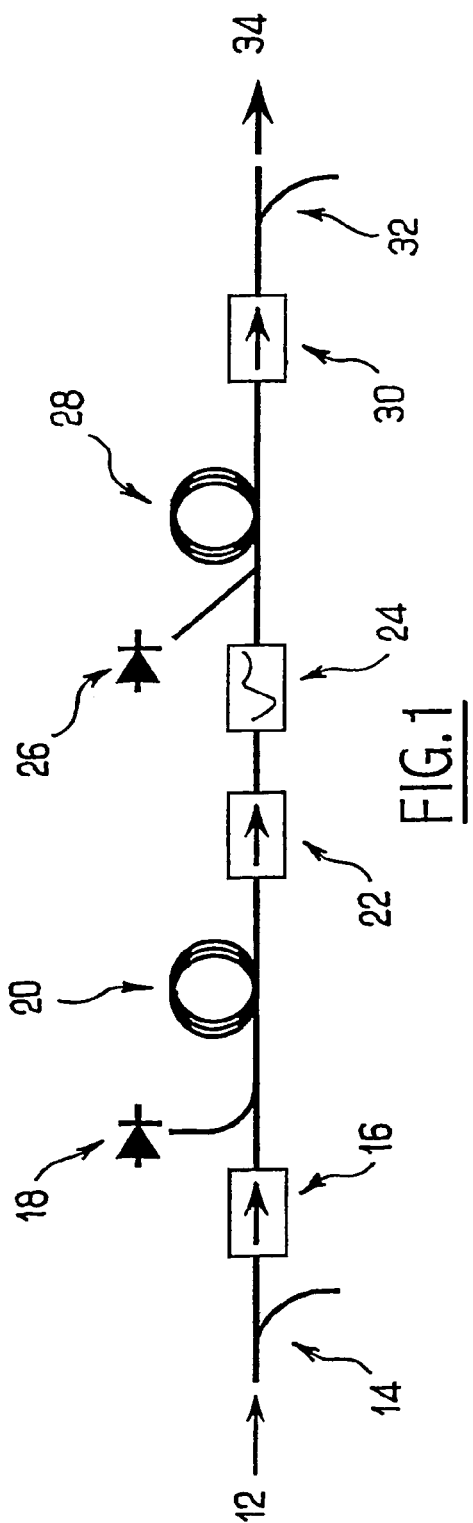
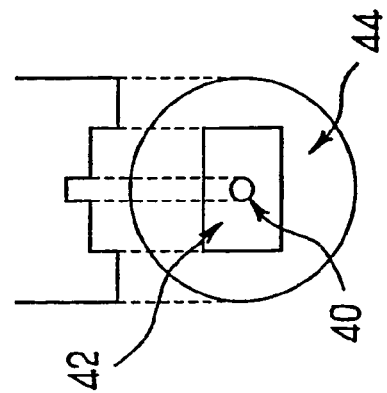
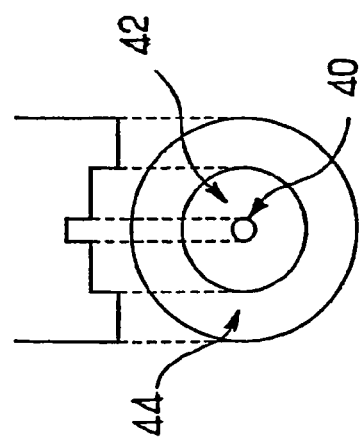

METHOD FOR MODELING OPTICAL FIBER AMPLIFIERS

CROSS REFERENCE TO RELATED APPLICATION

This application claims the benefit of the filing date of International Application No. PCT/FRO3/00887, filed Mar. 20, 2003, the disclosure of which is hereby incorporated by reference.

The present invention relates generally to optical telecommunications, and more particularly to the field of optical fiber amplifiers.

More precisely, the present invention relates to a method of modeling optical fiber amplifiers.

The present invention applies in particular to modeling double-clad optical fiber amplifiers doped with erbium-ytterbium.

Fiber amplifiers enable a signal to be amplified in entirely optical manner, which explains why they are in widespread use in optical telecommunications. Reference can usefully be made on this point to documents [1], [2], [3], and [4].

One possible configuration for a fiber optical amplifier is shown in accompanying FIG. 1.

In FIG. 1, there is shown diagrammatically a fiber amplifier comprising in cascade from an upstream end towards a downstream end: at 12 an input optical signal, e.g. of the dense wave-division-multiplexed (DWDM) type; at 14 a coupler, e.g. a 5% coupler; at 16 an isolator; at 18 a light pump source, e.g. at 980 nanometers (nm); at 20 a segment of fiber, e.g. of erbium-doped single-mode type; at 22 an isolator; at 24 a gain flattening filter (GFF) segment; at 26 a multimode pump light source, e.g. in the form of a diode; at 28 a segment of fiber, e.g. of the double-clad ytterium and erbium doped type; at 30 an isolator; at 32 a coupler, e.g. a 5% coupler; and at 34 the output signal.

The amplifying fiber 10 that is used may be doped with Er or Yb or may be co-doped with Er/Yb in order to achieve higher gain. In which case it is often double-clad (as shown diagrammatically in FIGS. 2 and 3) and is pumped by one or more multimode laser pumps 26.

FIG. 2 corresponds to a first variant doped double-clad fiber. More precisely, in the bottom portion of FIG. 2 there can be seen a right section of such a fiber, and in the top portion of FIG. 2 there can be seen the index profile of said fiber. It comprises a single-mode core 40 surrounded by first cladding 42 that is multimode and of index lower than that of the core 40. The first cladding 42 is itself surrounded by second cladding 44 possessing an index that is lower than that of the first cladding 42.

FIG. 3 corresponds to a second variant of doped double-clad fiber. In this case likewise there can be seen in the bottom portion of FIG. 3 a right section of such a fiber, and in the upper portion of FIG. 3, a corresponding index profile. FIG. 3 shows a fiber comprising a single-mode core 40 surrounded by first cladding 42 that is multimode, and of lower index. The first cladding 42 is surrounded by second cladding 44 of index lower than that of the first cladding 42.

The fibers in FIGS. 2 and 3 may be doped with Er, or Yb, or with Er and Yb.

In FIG. 2, the first cladding 42 presents an outline that is circularly symmetrical, whereas in FIG. 3, the first cladding 42 presents an outline that is rectangular.

The parameters of the fiber amplifier, such as gain, noise figure, and flatness of the amplified spectrum, all have a direct impact on the performance and the quality of the optical link of which the amplifier forms a part. This means that it is necessary to be able to design amplifiers having given characteristics and to be able to optimize the performance thereof.

There exist several known methods of greater or lesser sophistication dealing with the design of fiber amplifiers.

So far as the inventor is aware, existing methods take account of only a limited number of physical effects specific to co-doped Er/Yb fibers, and this can lead to inexact prediction of the performance of the amplifier. In addition, known methods require large amounts of processor time.

The present invention thus seeks to provide a novel method enabling performance to be predicted in terms of amplification (in particular gain spectra and noise factor, amplified spontaneous emission (ASE), residual pumping), for an amplifier including an Er/Yb co-doped fiber, on the basis of the parameters of the fiber used (effective sections, dopant concentrations, lifetime, optogeometrical parameters), and the powers and the wavelengths of the pumps and the input signals, under steady conditions.

In the context of the present invention, this-object is achieved by a method which consists in:

establishing the speed equations and the propagation equations of physical phenomena or effects involved in an optical fiber amplifier;

obtaining exact analytic solutions for the propagation equations of signals in the fiber, discretizing them, and interpolating them along the fiber;

solving the previously discretized speed equations by injecting into them solutions obtained from the propagation equations; and delivering the performance parameters of the fiber in terms of amplification.

According to another and preferred characteristic of the present invention, the speed equations are solved by numerical and iterative methods for solving systems of non-linear equations.

The present invention makes it possible in particular to take account of all of the physical effects specific to the amplifying medium that have previously been ignored in existing methods (e.g.: Er—Er ion pairs; Er—Yb backtransfer; Er ion conversion; absorption by excited state).

The method of the present invention thus makes it possible to design and optimize an optical amplifier using an Er/Yb co-doped fiber, by taking account of the characteristics of the fiber and of other components of the amplifier (isolators, couplers, gain-equalizing filters). It also makes it possible to predict the behavior of an existing amplifier under operating conditions that are different from those for which the amplifier was designed. It also makes it possible to optimize methods of fabricating Er/Yb co-doped fibers in order to improve the performance thereof. The method in accordance with the present invention is also directly applicable to single-clad fibers that are Er/Yb co-doped, and also to fibers that are doped with Er only (whether double or single clad). In addition, it takes charge of single-mode or multimode pumping when double-clad fibers are used. Thus, the method in accordance with the present invention constitutes a powerful tool for designing and optimizing fiber amplifiers and fibers on their own.

The method in accordance with the present invention also makes it possible, with very fast execution, to model an amplifying medium accurately and in detail, providing precision that is greater than that of existing methods.

Other characteristics, objects, and advantages of the present invention will appear on reading the following detailed description made with reference to the accompanying drawings, given as non-limiting examples, and in which:

FIG. 1, described above, is a schematic for the structure of a prior art optical fiber amplifier;

FIGS. 2 and 3, described above, show the right section and the index profile of two doped fibers suitable for use in the context of the invention;

The present invention relies on the following considerations.

The particular description below relates to a fiber doped with Er and Yb. Nevertheless, the present invention is not limited to this particular circumstance. It applies, for example, equally well to a fiber doped solely with Er or solely with Yb, or to any equivalent doping (with single or double cladding and with single-mode or multimode pumping when the fiber is double-clad).

Figure 4:
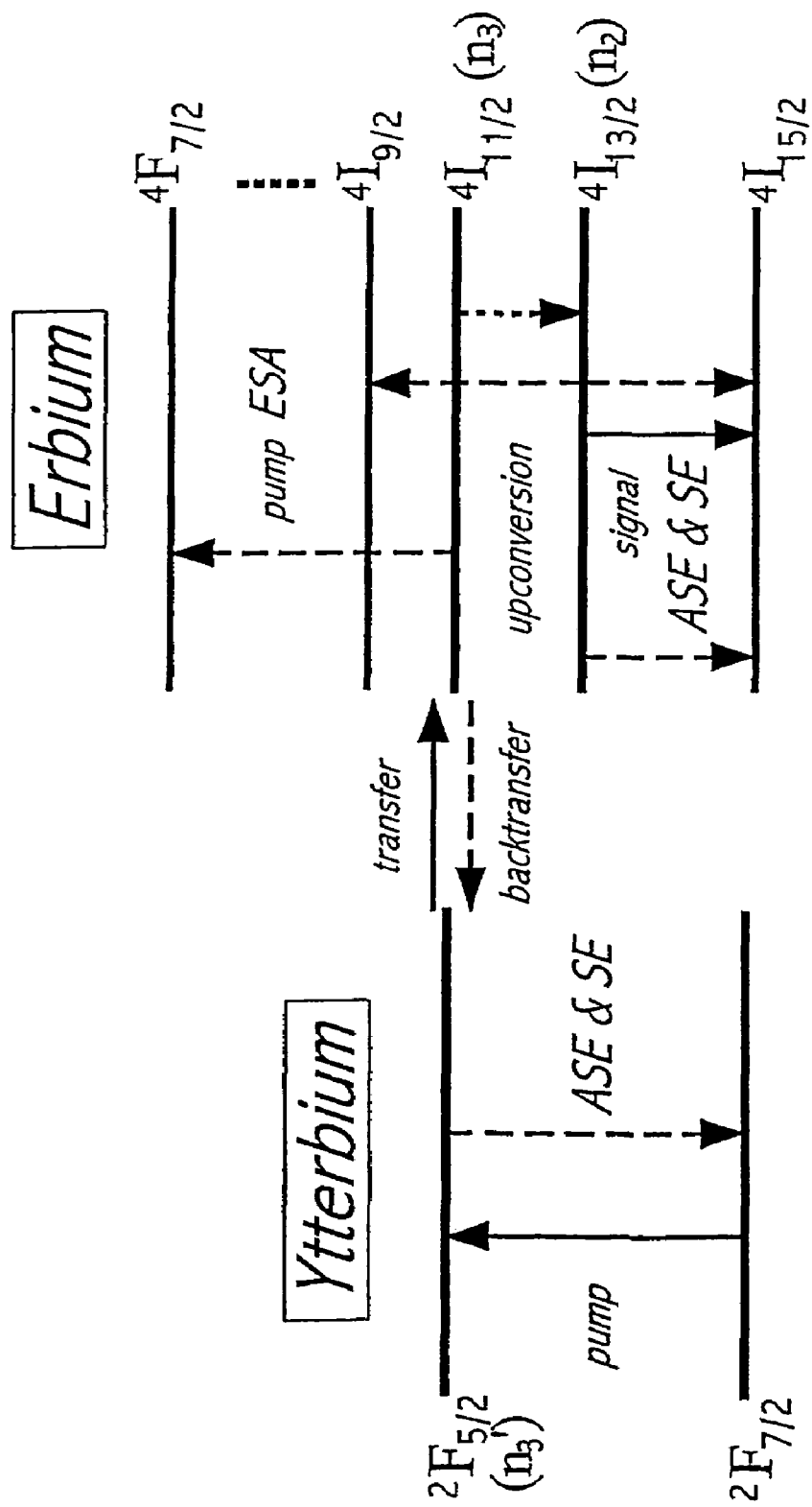
FIG. 4 is a diagram showing the energy levels of the elements Er and Yb in a silica matrix.

The amplifying medium may be described by a given number of energy levels of the elements Er and Yb in a silica matrix (which matrix may also be doped with P, Al, etc.); as shown in FIG. 4.

The populations of these levels, and their interactions are governed by a system of speed equations coupled via the parameters of the fiber (effective sections, lifetime, dopant concentrations, optogeometrical parameters).

The system of speed equations is associated with differential equations for propagation of each of the signals present in the fiber (input signal, pump signal, amplified spontaneous emission).

Figure 5:
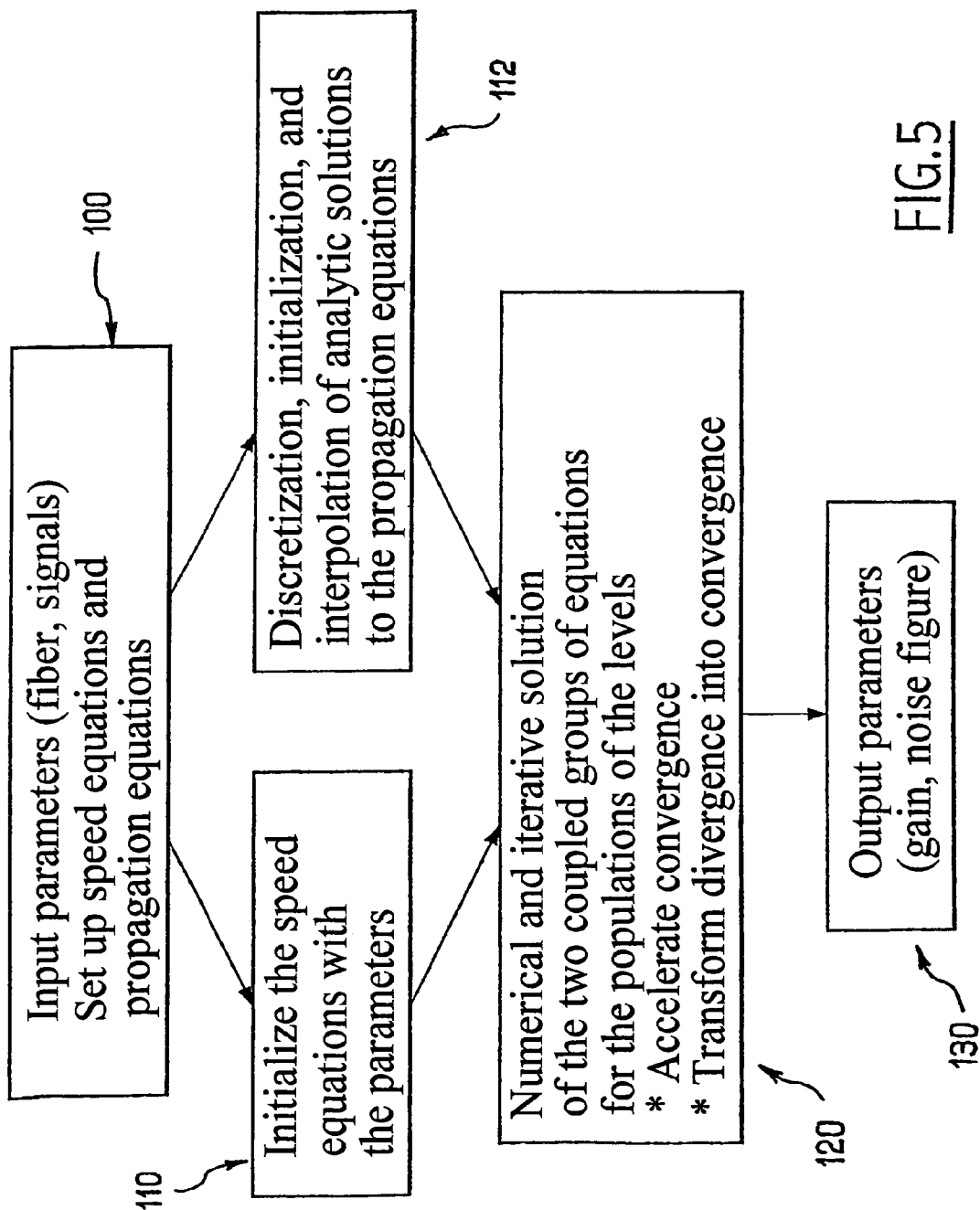
FIG. 5 is a general flow chart of the method in accordance with the present invention.

The general flow chart of the method of modeling in accordance with the present invention is shown in FIG. 5.

The first step 100 consists in establishing the entry parameters and the propagation and speed equations.

The speed equations are initialized on the basis of parameters that are specific to the case under analysis, in step 110.

In parallel, in step 112, formal analytic solutions of the propagation differential equations are discretized uniformly along the fiber and expressed as a function of the populations of the energy levels.

The populations of the levels are likewise discretized uniformly and interpolated between the discretization points, e.g. by the cubic spline method.

Thereafter, the solutions obtained in this way for the propagation equations are injected into the speed equations in step 120.

By using numerical and iterative methods for solving systems of non-linear equations, the speed equations are solved simultaneously along the fiber relative to the populations of the levels.

In step 130, the solutions as obtained in this way provide the powers of the various signals. On the basis of these powers, it is possible to deduce directly the desired amplifier parameters (gain, noise figure, etc.).

Still more precisely, the method of the present invention is preferably based on the following sequence of steps and on the equations given in Tables 1 to 8 below.

When setting up the speed and propagation equations, in addition to the main effect of direct transfer of energy from Yb to Er, account is taken in the context in the present invention of a certain number of physical effects that are typical of the amplifying medium and that can have an influence on its performance under certain conditions: 1) excited state absorption of the pump; 2) upconversion of Er ions; 3) the presence of Er—Er ion pairs; 4) backtransfer of energy from Er to Yb; 5) direct pumping of Er; and 6) amplified spontaneous emission of Yb.

More precisely, in the context of the invention, each of these effects can be included in or excluded from the model in order to estimate its importance in the amplification process. In addition, in the context of the present invention, an arbitrary combination of effects can be implemented.

The entry data to the method in accordance with the present invention are as follows: 1) the optogeometrical parameters of the co-doped fiber (core radius, areas of doped section and of inner cladding, cutoff frequency); 2) the physical parameters of the fiber (effective section, lifetimes of the levels, dopant concentrations, length, losses per unit length); 3) the effects specific to the amplifying medium (Yb—Er transfer time, Er—Yb backtransfer time, concentration of Er—Er ion pairs, Er upconversion coefficient, effective sections of excited state absorption); and 4) the steady inlet signals (powers, wavelengths, and directions of the pumps, powers and wavelengths of the signal, multimode or single-mode absorption of the pump).

The method of the present invention preferably takes account in step 100 of the entry parameters of the model and of the following corresponding physical phenomena.

1. Amplifying Fiber Parameters:
    a. Optogeometrical Parameters
        Cutoff wavelength $\lambda_c$ in nm
        Core radius r in meters (m): a (core area: $\pi r^2$)
        Doped area in $m^2$
        Multimode area in $m^2$
    b. Physical Parameters
        Length L in m
        Signal/pump losses per unit length $l_s/l_p$ in decibels per meter (dB/m)
        Er concentration $N_E$ in $m^{-3}$
        Yb concentration $N_Y$ in $m^{-3}$
        Er lifetime $\tau_E$ in seconds (s)
        Yb lifetime $\tau_Y$ in s
        Lifetime of unstable Er level $\tau_{32}$ in s
        Effective spectral sections in absorption/emission of Er $\sigma_a^E/\sigma_e^E$ in $m^2$
        Effective spectral sections in absorption/emission of Yb $\sigma_a^Y/\sigma_e^Y$ in $m^2$
        Pump excited state absorption (ESA) effective section $\sigma_a^{ESA}$ in $m^2$
        Yb—Er transfer time $\tau_{tr}$ in s
    Er—Yr backtransfer time $\tau_{bt}$ in s
        Concentration of Er ion pairs k
        Upconversion coefficient $C_{EE}$ (or $\alpha$) in $m^3/s$
2. Amplifier Parameters
    Input signal: powers in milliwatts (mW)/wavelengths in nm
    Copropagating pump: powers in mW/wavelengths in nm
    Contra-propagating pump: powers in mW/wavelengths in nm
    Fiber inlet losses in dB
    Fiber outlet losses in dB
    Chromatic losses in dB (gain-equalizing filter)
3. Control Parameters (Flags of Value 0 or 1)
    a. Pumping
        Copropagating pumping.
        Contra-propagating pumping
        Single-mode/multimode pumping b. Physical Phenomena

- Presence of Er ion pairs
- Account taken of Yb ASE
- Account taken of direct Er pumping
- Account taken of backtransfer
- Presence of upconversion
- Presence of pump ESA The great majority of the parameters mentioned are included directly ("as is") in the speed equations, the propagation equations, and the expression for gain (cf. Tables 1, 2, and 3). The core area written a in Table 1 corresponds to the expression $\pi r^2$ in the above notations. The overlap factor $\Gamma$ encountered in the gain expressions (cf. Table 3) is estimated as being merely the ratio Sdop/Smult for multimode propagation; for single-mode propagation it is calculated using the "conventional" formula on the basis of the cutoff frequency $\lambda_c$ and the spectral range of interest. The fluxes F of the signals (pump, useful signal, amplified spontaneous emission of Er and Yb) propagating in the fiber (cf. Tables 1 and 2) are calculated by directly converting the corresponding powers into numbers of photons per second.

Table 1 explains the system of speed equations taken into account in step 110, which equations govern the populations of the quantum levels of the Er—Yb amplifying medium. These are thus the equations that determine the phenomenon, with the unknowns being the populations along the fiber. There are as many equations as there are unknown population inversions: $n_3'$, Yb excited level; $n_3$, Er unstable level; $n_2$ Er metastable level; $n_2'$, excited level of Er ion pairs.

TABLE 1

Speed equations

1. Ytterbium: excited level (inversion of population $n_3'$)

$$g_p^Y F_p + \int (g_{ASE}^Y F_{ASE}^Y + 4\beta^Y)dv + \frac{n_3'}{\tau_Y} N_Y a + \frac{n_3'(1 + n_2 - n_3)}{(1+2k)\tau_{tr}} N_Y a +$$
$$2k \frac{n_3'(1 - n_2')}{(1+2k)\tau_{tr}} N_Y a - \frac{(1 - n_3')n_3}{(1+2k)\tau_{bt}} N_Y a = 0$$

2. Erbium: unstable level (inversion of population $n^3$)

$$g_p^E F_p + \frac{n_3}{\tau_{32}} N_E a - \frac{n_3'(1 - n_2 - n_3)}{(1+2k)\tau_{tr}} N_Y a + \frac{(1 - n_3')n_3}{(1+2k)\tau_{bt}} N_Y a = 0$$

3. Erbium: metastable level (inversion of population $n_2$)

$$g_s F_s + \int (g_{ASE}^E F_{ASE}^E + 4\beta^E)dv + \frac{n_2}{\tau_E} N_E a - \frac{n_3}{\tau_{32}} N_3 a + C_{EE} N_E^2 n_2^2 a = 0$$

4. Erbium: level of ion pairs (inversion of population $n_2'$):

$$g_s^{pr} F_s + g_p^{pr} F_p + \int (g_{ASE}^{pr} F_{ASE}^E + 4\beta^E)dv + \frac{n_2'}{\tau_E} N_E a - 2 \frac{n_3'(1 - n_2')}{(1+2k)\tau_{tr}} N_Y a = 0$$

The magnitudes F in the speed equations represent the numbers of photons per second (fluxes) of the signals propagating along the fiber: (co- and contra-propagating pump), "useful" signal, and ASE (co- and contra-propagating amplified spontaneous emission).

The way they vary is governed by the propagation equations, given in Table 2. The variable z identifies position along the fiber, $0 < z \leq L$, where L is the length of the fiber.

TABLE 2

Propagation equations (Co- and contra-propagating) pump propagation:

$$\pm \frac{dF_p^\pm}{dz} = (g_p^E + g_p^Y - a_{ESA} - l_p) F_p^\pm$$

Signal propagation:

$$\frac{dF_s}{dz} = (g_s^E - l_s) F_s$$

ASE propagation (co- and contra-propagating amplified spontaneous emission)

$$\pm \frac{dF_{ASE}^\pm}{dz} = (g_{ASE} - l_s) F_{ASE}^\pm + 2\beta$$

The various gains g participating in the speed equations and the propagation equations are expressed in Table 3 via the population inversions $n_i(z)$ and the physical parameters of the fiber: absorption and emission effective sections $\sigma_e$ and $\sigma_a$ as a function of wavelength (for Er and Yb), Er and Yb dopant concentrations, $N_E$ and $N_Y$, overlap factor $\Gamma$. For the pump signal, this depends on the propagation mode in the fiber, single-mode or multimode (the amplified signal always propagates in single mode).

TABLE 3

Gain expressions

Gain: pump, signal, ASE (amplified spontaneous emission):

$$g = [(\sigma_e + \sigma_a)n - \sigma_a] N \Gamma$$

Gain: Er ion pairs:

$$g^{pr} = [(\sigma_e^E + 2\sigma_a^E)n_2' - 2\sigma_a^E] N_E \Gamma$$

ESA absorption (excited state absorption):

$$a_{ESA} = \sigma_a^{ESA} n_3 N_E \Gamma$$

ASE source term (amplified spontaneous emission):

$$\beta = \sigma_e n N \Gamma$$

The propagation equations (given in Table 2) are ordinary differential equations that are linear relative to the fluxes F; they can be solved analytically in step 112 relative to the fluxes, as specified in Table 4.

TABLE 4

Analytic solutions of the propagation equations (Co- and contra-propagating) pump propagation $$F_p^+(z) = F_p^+(0) e^{\int_0^z g_p dx}$$

$$F_p^-(z) = F_p^-(L) e^{\int_z^L g_p dx}$$

TABLE 4-continued

Analytic solutions of the propagation equations

Signal propagation:

$$F_s(z) = F_s(0) e^{\int_0^z g_s dx}$$

ASE propagation (co- and contra-propagating amplified spontaneous emission):

$$F_{ASE}^+(z) = 2\int_0^z \beta e^{\int_x^z g_{ASE} dy} dx$$

$$F_{ASE}^-(z) = 2\int_z^L \beta e^{\int_z^x g_{ASE} dy} dx$$

Consequently, after injecting these formal solutions into the speed equations, a system of non-linear functional equations is obtained in step 120 for determining the unknown population inversion $n_i(z)$.

In order to avoid the problems of analytically solving a system of functional equations in the context of the present invention, the fiber is discretized along its length to constitute M points, e.g. points that are equidistant (where equidistance is not required in general) and the unknown functions $n_i(z)$ are replaced by the vectors $n_i(z_k)$, k=1, 2, . . . , M, having M unknown components. This provides a system of non-linear equations having 4×M unknowns. This is the collocation method, summarized in Table 5.

TABLE 5

Collocation method $f_i(z; n_i(z)) = 0 \quad f_i(z_k; n_i(z_k)) = 0 \quad k = 1, 2, \ldots, M$ The analytic solutions of the propagation equations are then discretized at M points along the fiber, as shown in Table 6.

TABLE 6

Discretization of propagation equation solutions (Co- and contra-propagating pump propagation):

$$F_p^+(z_{k+1}) = F_p^+(z_k) e^{\int_{z_k}^{z_{k+1}} g_p dx}$$

$$F_p^-(z_k) = F_p^-(z_{k+1}) e^{\int_{z_k}^{z_{k+1}} g_p dx}$$

Signal propagation:

$$F_s(z_{k+1}) = F_s(z_k) e^{\int_{z_k}^{z_{k+1}} g_s dx}$$

ASE propagation (co- and contra-propagating amplified spontaneous emission):

$$F_{ASE}^+(z_{k+1}) = F_{ASE}^+(z_k) e^{\int_{z_k}^{z_{k+1}} g_{ASE} dx} + 2\int_{z_k}^{z_{k+1}} \beta e^{\int_x^{z_{k+1}} g_{ASE} dy} dx$$

-continued $$F_{ASE}^-(z_{k+1}) = F_{ASE}^-(z_{k+1}) e^{\int_{z_k}^{z_{k+1}} g_{ASE} dx} + 2\int_{z_k}^{z_{k+1}} \beta e^{\int_{z_k}^{z_{k+1}} g_{ASE} dy} dx$$

However, prior to substituting them in the speed equations, the integrals over z, taken between $z_k$ and $z_{k+1}$ that occur therein are determined explicitly, or at least approximately. For this purpose, and in order to improve the approximation of the integrals, the cubic spline interpolation method is applied, for example.

This method consists in connecting together the M points $n_i(z_k)$ for a given inversion i by cubic polynomials having first and second derivatives that are continuous at said points. The method is summarized formally in Table 7 where functions $F_1$ and $F_2$ serve to calculate the first and second derivatives of the spline, $x_k'$ and $x_k''$, the functional vectors $x_k$ being given for k=1, 2, . . . , M. The application of this method on the population inversions $n_i(z)$ amounts to interpolating their shape (specifically by cubic polynomial) between the discretization points $z_k$.

TABLE 7

Cubic spline method $x_i' = F_1(x_i) \quad x_i'' = F_2(x_i)$

By applying spline interpolation, it is possible to calculate very accurately the integrals taken between pairs of successive points $z_k$ and $z_{k+1}$. For the integrals of the gains g, the calculation is exact (for a cubic polynomial) and the formula is given in Table 8. The gains g can be converted into inversions n immediately, since the gains are linear functions of the inversions (cf. Table 3). Concerning the composite integrals that appear as second terms in the ASE expressions (cf. Table 6), they are approximated using Simpson's rule (parabola rule).

TABLE 8

Solving the gain integral $$\int_{z_k}^{z_{k+1}} g dx = \frac{L_k}{2}[g(z_k) + g(z_{k+1})] - \frac{L_k^3}{24}[g''(z_k) + g''(z_{k+1})]$$

After substituting the solutions of the propagation equations into the speed equations, these equations are solved iteratively in step 120 for the four unknown vectors $n_i(z_k)$, i=1, 2, 3, 4; k=1, 2, . . . , M; cf. Table 9. To do this, the inversions n contained in all of the gains g that appear as factors in expressions of the type gF are expressed; in this way, an iterative scheme is obtained relative to the inversions n as explained in the second equation in Table 9.

Table 9: Iterative Scheme

Vectors of unknowns; i=2, 2', 3, 3' (population inversion indices):

$n_i = [n_i(z_i), n_i(z_2), \ldots n_i(z_M)]$

Simple iterations: m=0, 1, 2, . . . (iteration counter):

$n_i^{(m+1)} = F_i(n_i^{(m)})$

Iterations with a relaxation parameter ω:

$n_i^{(m+1)} = (1-\omega)n_i^{(m)} + \omega F_i(n_i^{(m)}) = n_i^{(m)} + \omega[F_i(n_i^{(m)}) - n_i^{(m)}] (0 < \omega < 1)$ The numerical methods for solving the system of non-linear equations are preferably based on iterative procedures including methods of accelerating conversions (Aitken's process) and of transforming divergence into convergence (relaxation procedure).

Thus, in order to accelerate the convergence of this scheme, and also to convert divergence into convergence for certain particular sets of physical parameters, it is possible to use a more general iterative scheme, as defined by the relaxation parameter ω: Table 9, equation 3. A suitable choice of parameter ω, typically in the range 0.4 to 0.6, considerably improves the convergence of the iterative process.

In parallel with the main iterations, in the context of the present invention, a second iterative process is launched representing a generalization for M dimensions of Aitken's $\delta^2$ process given in Table 10. In practically all cases, this converges more quickly than the main iterative scheme, thus making it possible to reduce execution times, sometimes considerably.

Table 10: Accelerating Convergence

Matrix of M successive approximations and its finite differences:

$$N_k^{(m)} = [n_k^{(m)}, n_k^{(m-1)}, \ldots, n_k^{(m-M+1)}]$$

$$\Delta N_k^{(m)} = N_k^{(m)} - N_k^{(m-1)} \quad \Delta^2 N_k^{(m)} = \Delta(\Delta N_k^{(m)})$$

Aitken's process generalized to M dimensions:

$$n_k^{(m+1)} = n_k^{(m)} - \Delta N_k^{(m)} (\Delta^2 N_k^{(m)})^{-1} \Delta n_k^{(m)}$$

The output data preferably comprise at least: 1) the powers of the signal, the pumps, and the co- and contra-propagating amplified spontaneous emission at the end of the fiber; and 2) the spectral values for the gain and the noise figure at the end of the fiber.

It should be observed that in the context of the present invention, other parameters in addition to those described in 1) and 2) above may also be calculated and displayed (for example spectral densities of co- and contra-propagating amplified spontaneous emission).

Thus, in the context of the present invention, the output parameters may comprise the following:

1) variation in the power of the signal along the fiber/output power;

2) variation in the (co- or contra-propagating) pump power along the fiber/residual pump power (at the inlet or the outlet of the fiber);

3) accumulated co- and contra-propagating Er and Yb amplified spontaneous emission along the fiber/Er and Yb ASE at the inlet or the outlet of the fiber;

4) gain spectrum: calculated as the ratio of output signal/input signal;

5) noise factor spectrum: calculated on the basis of the gain and of Er ASE at the outlet from the fiber; and 6) variation in population inversion along the fiber.

Figure 6:
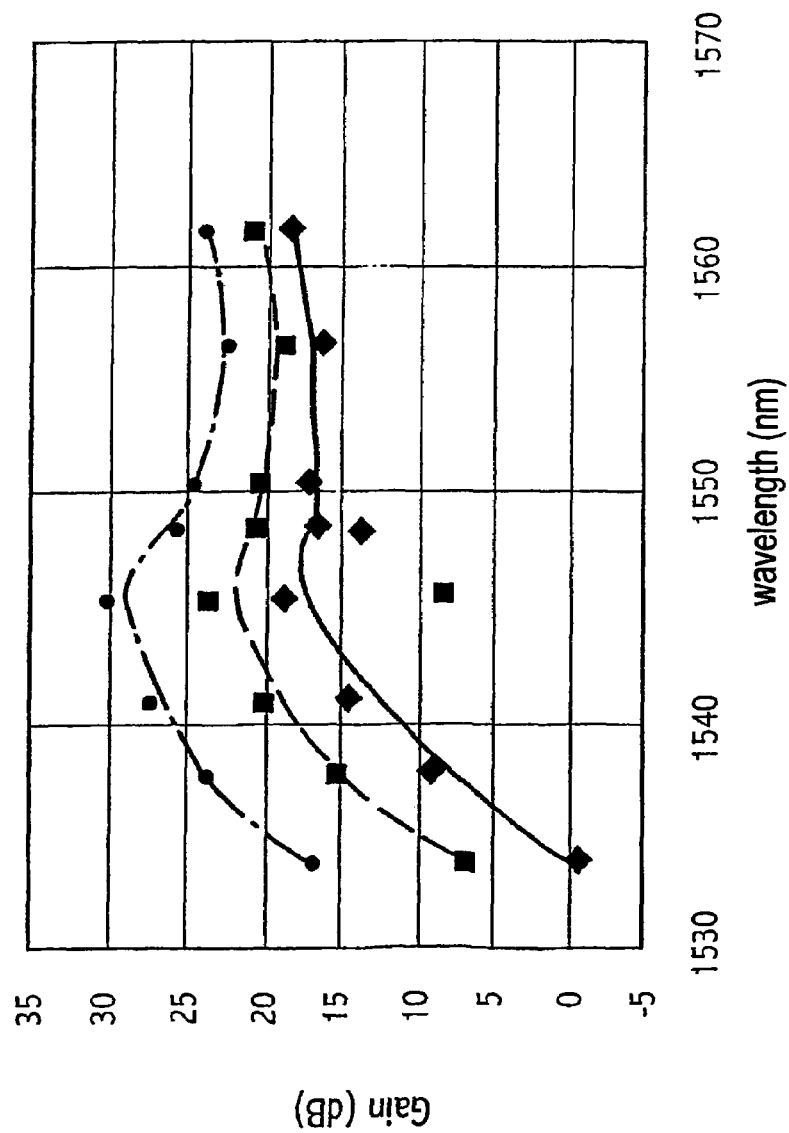
FIG. 6 is a graph plotting various curves of amplifier gain as a function of wavelength, resulting respectively from measurements and from modeling in accordance with the present invention.

The method in accordance with the present invention has been validated by being compared with experiments for several types of co-doped fiber. FIG. 6 shows the agreement between the model and experiment for a fiber of the Er/Yb co-doped type.

Naturally, the present invention is not limited to the particular implementations described above, but extends to any variant in the spirit of the invention.

In particular, the method in accordance with the present invention can be generalized to the case of a multistage amplifier, i.e. an amplifier comprising a plurality of stages each comprising a fiber, and separated by passive inter-stage losses (chromatic—e.g. a gain equalizing filter—or otherwise).

BIBLIOGRAPHY

[1] T. Kasamatsu et al., Appl. Phys. B 69 (1999), 491; F. di Pascuale et al., Proc. OFC, vol. 2 (IEEE, Piscataway, N.J., 1999), 4

[2] P. R. Morkel, in *Opt. Amplifiers Appl. Tech. Dig.*, vol. 17 (OSA, Washington, D.C., 1992), 206; P. F. Wysocki, in *OSA Trends Opt. Photon. Opt. Ampl. Appl.* 16 (1997), 46

[3] E. Delevaque et al., IEEE Photonics Technol. Lett. 5 (1993), 73

[4] F. Sanchez et al., Phys. Rev. A 48 (1993), 2220; E. Delevaque, Ph.D. Thesis (Université de Lilles, Villeneuve d'Ascq, 1993), 137.

The invention claimed is:

1. A method of modeling an optical fiber amplifier, comprising:

establishing speed equations and propagation equations of physical phenomena or effects involved in an optical fiber amplifier;

obtaining exact analytic solutions for the propagation equations of signals in a fiber;

discretizing the exact analytic solutions;

interpolating the exact analytic solutions along the fiber;

solving the speed equations by injecting solutions obtained from the propagation equations into the speed equations; and delivering performance parameters of the fiber in terms of amplification, so that the optical fiber amplifier can be designed or optimized based on the performance parameters.

2. A method according to claim 1, wherein the speed equations are solved by numerical and iterative methods for solving systems of non-linear equations.

3. A method according to claim 1, wherein the method models based on parameters selected from the group consisting of Er—Er ion pairs ions, Yb—Er forward transfers, Er—Yb back-transfers, conversion of Er ions, excited state absorption, direct Er pumping, and Yb amplified spontaneous emission.

4. A method according to claim 1, wherein the method models based on parameters selected from the group consisting of: 1) optogeometrical parameters of the doped fiber; 2) physical parameters of the fiber; 3) amplifying medium specific effects; and 4) steady input signals.

5. A method according to claim 1, wherein populations of levels are discretized uniformly and are interpolated between discretization points.

6. A method according to claim 1, wherein the solution of the speed equations is based on an iterative procedure including a method of accelerating conversion.

7. A method according to claim 6, wherein the method of accelerating conversion is of the Aitken's process type.

8. A method according to claim 1, wherein the solution of the speed equations is based on an iterative procedure including a method of transforming divergence into convergence.

9. A method according to claim 1, wherein the performance parameters that are delivered comprise elements selected from the group consisting of powers of a signal, pumps, co- and contra-propagating amplified spontaneous emission at an end of the fiber, and spectral values of gain and Noise FIG. at the end of the fiber.

10. A method according to claim 1, wherein the delivered performance parameters comprise elements selected from the group consisting of variation in power of a signal along the fiber/output power, variation in co- or contra-propagating pump power along the fiber/residual pump power at an inlet or an outlet of the fiber, co- and contra-propagating Er and Yb ASE accumulation along the fiber/Er and Yb ASE at the inlet or the outlet of the fiber, gain spectrum calculated as the ratio output signal/input signal, noise factor spectrum calculated based on gain and the Er ASE at the outlet of the fiber, and variation in population inversion along the fiber.

11. A method according to claim 1, wherein the method is applied to modeling a fiber amplifier having Er, Yb, or Er and Yb doping.

12. A method according to claim 4, wherein the optogeometrical parameters are selected from the group consisting of core radius, an area of a doped section, an area of inner cladding, and cutoff frequency.

13. A method according to claim 4, wherein the physical parameters of the fiber are selected from the group consisting of effective sections, lifetimes of levels, dopant concentrations, length, and losses per unit length.

14. A method according to claim 4, wherein the effects specific to the amplifying medium are selected from the group consisting of Yb—Er transfer time, Er—Yb back-transfer time, concentration of Er—Er ion pairs, Er upconversion coefficient, and effective sections of excited state absorption.

15. A method according to claim 4, wherein the steady input signals are selected from the group consisting of power of a pump, wavelength of the pump, direction of the pump, power of the steady input signal, wavelength of the input signals, and mode of absorption of the pump.

16. A method according to claim 5, wherein interpolation is performed using a cubic spline method.

* * * * *

UNITED STATES PATENT AND TRADEMARK OFFICE
CERTIFICATE OF CORRECTION

PATENT NO. : 7,151,631 B2
APPLICATION NO. : 10/497881
DATED : December 19, 2006
INVENTOR(S) : Razvigor Ossikovski, Patrick Even and Nicolas Tallaron It is certified that error appears in the above-identified patent and that said Letters Patent is hereby corrected as shown below:

Column 10, line 67, "FIG" should read --Figure--.

Signed and Sealed this

Eighth Day of May, 2007

JON W. DUDAS
*Director of the United States Patent and Trademark Office*